(12) United States Patent
Wherry et al.

(10) Patent No.: US 7,961,701 B2
(45) Date of Patent: Jun. 14, 2011

(54) METHOD AND SYSTEM FOR EVENT POLLING

(75) Inventors: Elaine Wherry, San Jose, CA (US); Sandy Jen, Menlo Park, CA (US)

(73) Assignee: Meebo Inc., Mountain View, CA (US)

( * ) Notice: Subject to any disclaimer, the term of this patent is extended or adjusted under 35 U.S.C. 154(b) by 687 days.

(21) Appl. No.: 11/691,439

(22) Filed: Mar. 26, 2007

(65) Prior Publication Data
US 2007/0224978 A1 Sep. 27, 2007

Related U.S. Application Data

(60) Provisional application No. 60/785,484, filed on Mar. 24, 2006, provisional application No. 60/789,339, filed on Apr. 5, 2006.

(51) Int. Cl.
G06F 15/16 (2006.01)
G06F 3/00 (2006.01)
(52) U.S. Cl. ........ 370/346; 709/204; 709/205; 709/206; 709/207; 719/314
(58) Field of Classification Search .................. 709/230, 709/204–207; 719/314
See application file for complete search history.

(56) References Cited

U.S. PATENT DOCUMENTS

| | | | |
|---|---|---|---|
| 2004/0117443 A1 | 6/2004 | Barsness | |
| 2004/0202117 A1 | 10/2004 | Wilson et al. | |
| 2004/0215703 A1* | 10/2004 | Song et al. | 709/201 |
| 2005/0033813 A1* | 2/2005 | Bhogal et al. | 709/206 |
| 2005/0108392 A1 | 5/2005 | Glasser et al. | |
| 2005/0198397 A1 | 9/2005 | Park | |
| 2005/0198589 A1 | 9/2005 | Heikes et al. | |
| 2005/0240674 A1* | 10/2005 | Depalma et al. | 709/230 |
| 2006/0025091 A1* | 2/2006 | Buford | 455/154.2 |

FOREIGN PATENT DOCUMENTS
WO PCT/US2007/064959 3/2007

OTHER PUBLICATIONS

International Search Report of the International Searching Authority for Application No. PCT/US2007/064959, mailed on Feb. 14, 2008, 3 pages.
Written Opinion of the International Searching Authority for Application No. PCT/US2007/064959, mailed on Feb. 14, 2008, 4 pages.
International Preliminary Report on Patentability for Application No. PCT/US2007/064959, mailed on Oct. 9, 2008, 6 pages.

* cited by examiner

*Primary Examiner* — Pierre-Louis Desir
*Assistant Examiner* — Joshua Schwartz
(74) *Attorney, Agent, or Firm* — Kilpatrick Townsend & Stockton, LLP

(57) ABSTRACT

A method and system for event polling have been disclosed. According to one embodiment, a computer-implemented method comprises receiving a session request from a client device. A session key is provided to the client device in response to the session request. A session timer is set for a predetermined time period. An event revision number is received from the server device. The client is provided with an updated event revision number if the event revision number matches an expected revision number. An event from an instant messaging server is placed in a queue until the event revision number matches the expected revision number, the event including one or more of instant messages, buddy events, typing, and application events.

17 Claims, 5 Drawing Sheets

400

500

METHOD AND SYSTEM FOR EVENT POLLING

The present application claims the benefit of and priority to U.S. Provisional Patent Application No. 60/785,484 entitled "A Method and System for Event Polling" and filed on Mar. 24, 2006, and is hereby, incorporated by reference. The present application further claims the benefit of and priority to U.S. Provisional Patent Application No. 60/789,339 entitled "A Method and System for Event Polling" and filed on Apr. 5, 2006, and is hereby, incorporated by reference.

TECHNICAL FIELD

The field of the invention relates generally to computer systems and more particularly relates to a method and system for event polling.

BACKGROUND

Instant Messaging (sometimes referred to as IM) enables users to easily see whether a chosen buddy (such as, e.g., a friend, colleague, co-worker or the like) is connected to the Internet and, if so, to exchange messages with them. Instant Messaging typically differs from common e-mail in the immediacy of the message exchange. Typically, IM exchanges are text-only. However, some services (e.g., AOL Instant Messaging) enable voice messaging and file sharing. In IM, both users need to subscribe to the service (e.g., and have certain software on their user devices), and need to be online at the same time. In addition, the intended recipient needs to be willing to accept instant messages. If one tries to send an IM to someone who is not online, or who is not willing to accept an Instant Message, a notification is typically provided that the transmission cannot be completed. If the recipient's online software is set to accept Instant Messages, it typically alerts the recipient with a distinctive sound and displays a Pop-Up window that indicates that an IM has arrived, and that enables the recipient to accept or reject it, or displays a Pop-up window containing the incoming message. In general, IM can be truly or virtually instantaneous (with, e.g., delays of usually less than a number of seconds), such that it is typically possible for two people to have a real-time online "conversation" by sending IMs to each other.

IM users typically use a networked computer and IM client software to exchange messages with one another in conversational style. An IM client provides an interface for users to compose, send, receive, and read text messages. Examples of IM clients that are popular today include IBM's SameTime, MSN Messenger, Yahoo!, and AOL Instant Messenger.

In a graphical display, an IM client usually provides several windows, through which a user can compose and read messages. IM clients generally provide some facility for managing lists of contacts, particularly other IM users. These lists are referred to colloquially as "buddy lists." It is common practice to organize such lists into groups of related users, wherein the IM client displays the various groups in a hierarchical tree that can be collapsed and expanded as the user desires.

SUMMARY

A method and system for event polling have been disclosed. According to one embodiment, a computer-implemented method comprises receiving a session request from a client device. A session key is provided to the client device in response to the session request. A session timer is set for a predetermined time period. The server receives the event revision number from the client device. The server provides the client with an updated event revision number if the event revision number matches an expected revision number. An event from an instant messaging server is placed in a queue until the event revision number matches the expected revision number, the event including one or more of instant messages, buddy events, typing, or application events.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for event polling have been disclosed. According to one embodiment, a computer-implemented method comprises receiving a session request from a client device. A session key is provided to the client device in response to the session request. A session timer is set for a predetermined time period. The server increments the event revision number when the client returns the most recent event revision number in its subsequent event request, thus communicating to the server that the client has received and processed previous events. An event from an instant messaging server is placed in a queue until the event revision number matches the expected revision number, the event including one or more of instant messages, buddy events, account, and other application events.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
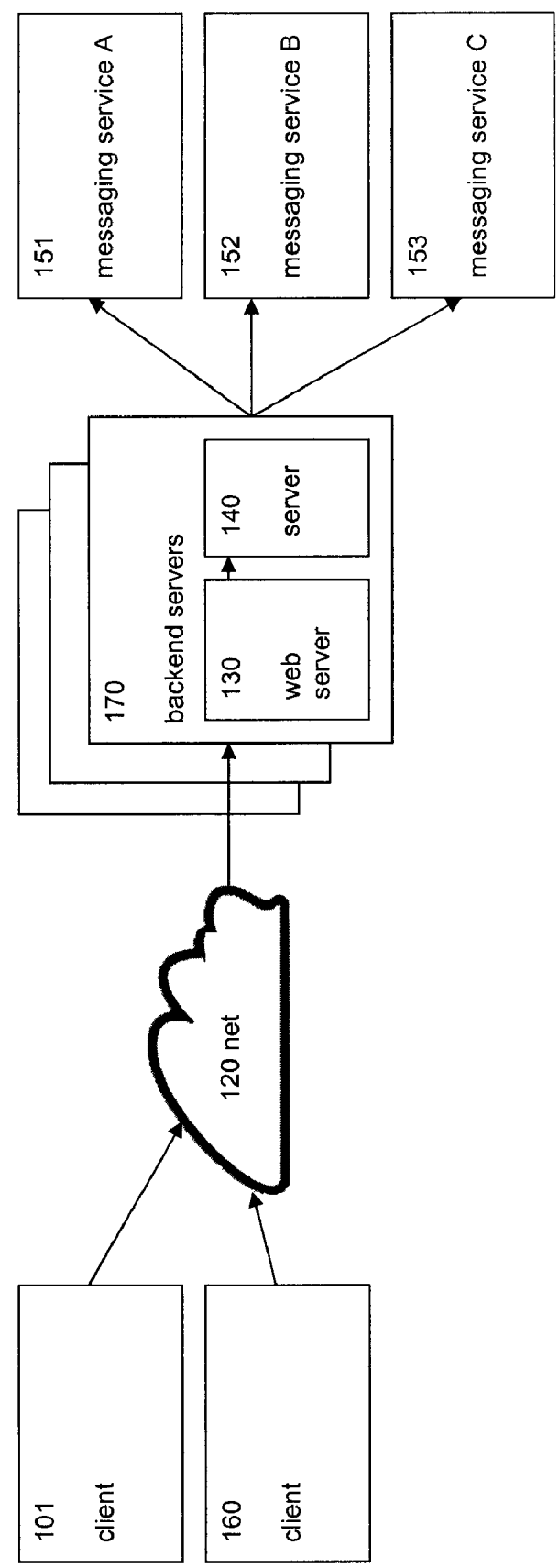
FIG. 1 illustrates a block diagram an exemplary system for peer-to-peer instant messaging with event polling.

FIG. 1 illustrates a block diagram of an exemplary system for peer-to-peer instant messaging with event polling, according to one embodiment of the present invention. System 100 includes clients 110 and 160, a multiple messaging service web server 130, messaging service web servers 151-153, and a messaging service server 140. System 100 is interconnected by Internet 120. According to one embodiment, network 120 is described as being the Internet, alternatively, the network 120 may be a Wide Area Network (WAN), a Local Area Network (LAN), or any other system of interconnections enabling two or more devices to exchange information. Further, the network 120 may include a wireless network, such that one or more of clients 110, 160 may be wireless devices.

One or more of device nodes clients 110, 160 may allow network access via a web browser such as Microsoft's Internet Explorer, Netscape Browser or the Safari Browser that support HTML and JavaScript. Additionally, clients 110, 160 may be mobile devices, such as videophones, laptops, smart phones, mobile phones, PDAs, game devices such as the PSP manufactured by Sony Electronics, multimedia devices such as iPods manufactured by Apple Computers of Cupertino, Calif., or similar devices.

According to one embodiment, server 140 may be a Gaim server such as an open-source GTK2-based instant messenger application (under GPL). It supports multiple protocols via modules, including AIM, ICQ, Yahoo!, MSN, Jabber, IRC, Napster, Gadu-Gadu and Zephyr. Messaging service server 140 allows clients to log in to multiple accounts on multiple instant messaging (IM) networks simultaneously. This means that you can be chatting with friends on AOL Instant Messenger, talking to a friend on Yahoo Messenger, and sitting in an IRC channel all at the same time.

Messaging service server 140 runs on a number of platforms, including Windows, Linux, and Qtopia (Sharp Zaurus and iPaq). Messaging service server 140 is not endorsed by or affiliated with AOL TimeWarner, Microsoft, or Yahoo. Although messaging service server 140 is described, any multi-protocol server may be used. According to one embodiment, Gaim does not include the GTK visual portion in order to be optimized as a web server application. In one embodiment, the messaging service server 140 is comprised mostly of back-end functionality and no graphical user interface.

Messaging service web servers 151-153 are instant messaging servers. For example, messaging service A web server 151 may enable AOL Instant Messenger, messaging service B web server 152 may enable Yahoo! Instant Messenger, and messaging service C web server 153 may enable MSN Instant Messenger. Server 140 communicates with messaging service web servers 151-153 to allow clients to log in to multiple accounts on multiple IM networks simultaneously. The processes executed within system 100 may be implemented in software or hardware, a device that is, or can be, connected to a common network, such as the Internet. Client 110, 160 could be fixed devices such as set top boxes, desk top computers, media recorders such as those manufactured by TiVo, Inc. of Alviso, Calif., game devices such as the XBox manufactured by Microsoft, Corp. of Redmond, Wash. or similar devices.

Multiple messaging service web server (MMSW server) 130 enables a web based instant messaging service for clients 110 and 160 that does not require IM software to be loaded on clients 110 and 160. According to one embodiment, the instant messaging application is web-based and communications between clients 110, 160 and MMSW server 130 take the form of XmlHttpRequests. MMSW server 130 includes the ability to efficiently query messaging service server 140 for new events for clients 110, 160. MMSW server 130 is a web server that uses any one of a number of well-known protocols and/or applications including HyperText Transfer Protocol (HTTP), File Transfer Protocol (FTP), Internet Relay Chat (IRC), etc., via a TCP/IP connection (not shown in this view) or some other connection well known in the art. The operating system may be Windows®, LINUX, SUN Solaris®, Mac OS or other similar operating system. In one embodiment, Multiple messaging service web server 130 may be a dedicated server, that uses processing logic, tools and databases, that could be built using a combination of technologies such as those from Apache Software (www.apache.org), LightTPD (www.lighttpd.net), such as Tomcat servers; Java based technologies such as J2EE, EJB, JBOSS, JDBC; and/or databases such as MySQL.

System 100 may also include other supporting computing software and hardware, for example, databases, computers, and user interface servers.

Figure 2:
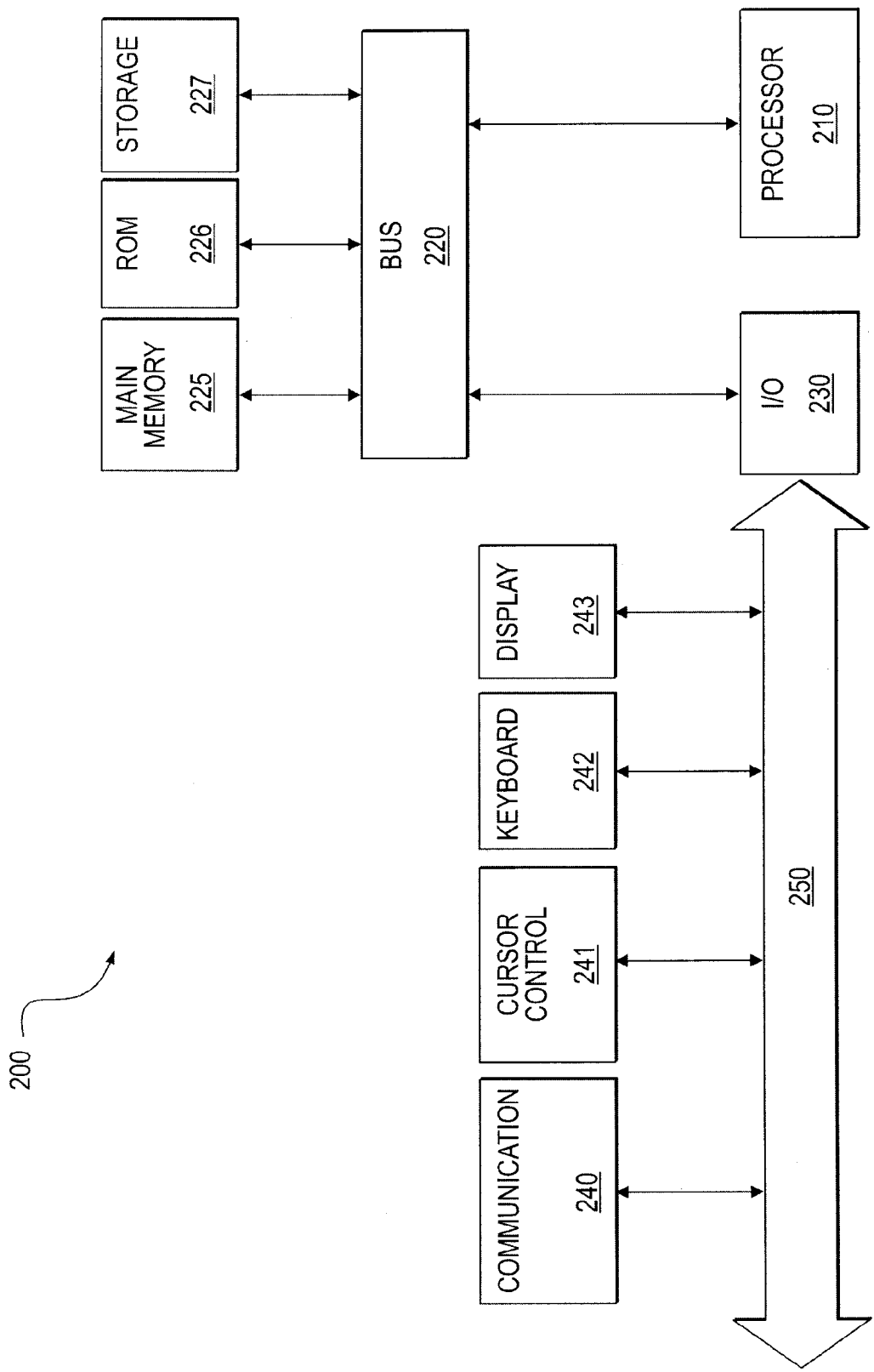
FIG. 2 illustrates an exemplary computer architecture for use with the present system, according to one embodiment of the invention.

FIG. 2 illustrates an exemplary computer architecture for use with the present system, according to one embodiment of the invention. Computer architecture 200 can be used to implement a client 110, 160, or a server 130, 140, 151-153 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, web pages rendered by MMSW server 130 and related information may be presented to the user on the display device 243.

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Figure 3:
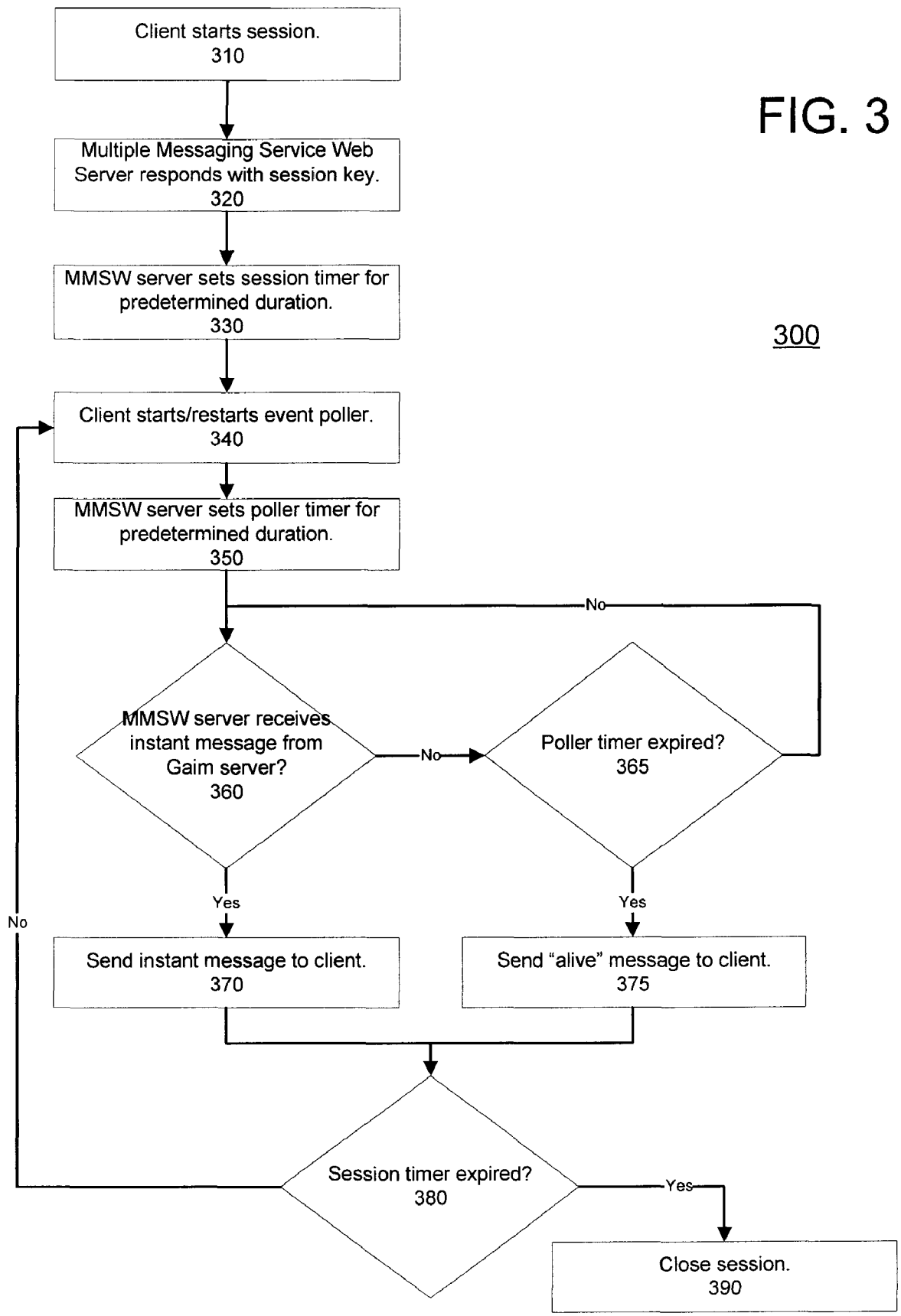
FIG. 3 illustrates a flow diagram of an exemplary polling process, according to one embodiment of the present invention.

FIG. 3 illustrates a flow diagram of an exemplary polling process 300, according to one embodiment of the present invention. Suppose client 110 wishes to instant message client 160, client 110 starts an IM session (310). MMSW server 130 responds to client 160 with a unique session key (320). MMSW server sets a pre-determined session time-out, for example two minutes (330)—this time-out indicates an interval of time where if the server receives no communication from the client, the session key is rendered invalid thus disabling further communication between the client and the server. Client 110 sets a client timer, for example, forty-five seconds, and sends an event query request to the server, indicating the client's "alive" status. Every event request includes the unique session key to verify the client's authentication. MMSW server 130 sets a server timer time-out for a predetermined duration, for example thirty seconds.

MMSW server 130 may receive an event, (e.g. an instant message, account preference changes, buddies coming on/offline, typing notifications) from a messaging server, e.g. Messaging Service A 151. If this instant message is received from messaging service server 140 within the server time-out period, it serves as an event trigger and the message is sent to client 110 (270). After the response is sent and the client sends a subsequent event request, the server time-out period starts again. If the server timeout period is reached and no events are triggered, MMSW server 130 sends an events response message to client 110 (275) with an updated revision number and the server time-out period is reset. If the session timer expires (280) because the server has not received any requests with a valid session key within the session timer duration, the session is closed (290), otherwise client 110 restarts the client timer (240) and the event polling flow continues as described above.

If the client 110, 160 cannot communicate with the MMSW server 130, the client 110, 160 attempts to reconnect with the MMSW server 130 for a predetermined number of times (defined as the server no-response limit) at predetermined intervals (defined by the network failure timer), for example, 12 times at 10 second intervals. If communication between the MMSW server 130 and client 110, 160 cannot be reestablished, the client 110, 160 stops sending messages to the MMSW server 130 and signals to the user that the IM session has detected a network interruption. The user is presented with the option to reconnect or retry. Assuming that a network connection is available when the user selects reconnect, the server-client communication is reestablished. Alternatively, the client could automatically reconnect to the server at predetermined intervals or using exponential backoff to schedule future reconnection attempts.

Each event sent from a client 110, 160 to MMSW server 130 includes an event revision number. Accordingly, each event is sequentially numbered so that the MMSW server 130 and client 110, 160 can keep in sync. For example, the first event poll that is sent from the client 110, 160 to the MMSW server 130 is number 0. When the MMSW server 130 responds to that event poll, it ups the revision to 1. The next time the client 110, 160 sends another event poll, the revision number will be 1 (or whatever the last MMSW server 130 event response returned). The client 110, 160 never increments the revision number, only the MMSW server 130. This is helpful because the MMSW server 130 queues the messaging events. Even after sending the response to the client 110, 160 and incrementing the revision number, the MMSW server 130 stores in memory the previous events until the client 110, 160 returns an event poll with the current revision number. This guarantees that in the event of a network disruption or application error, no messages are lost.

Figure 4:
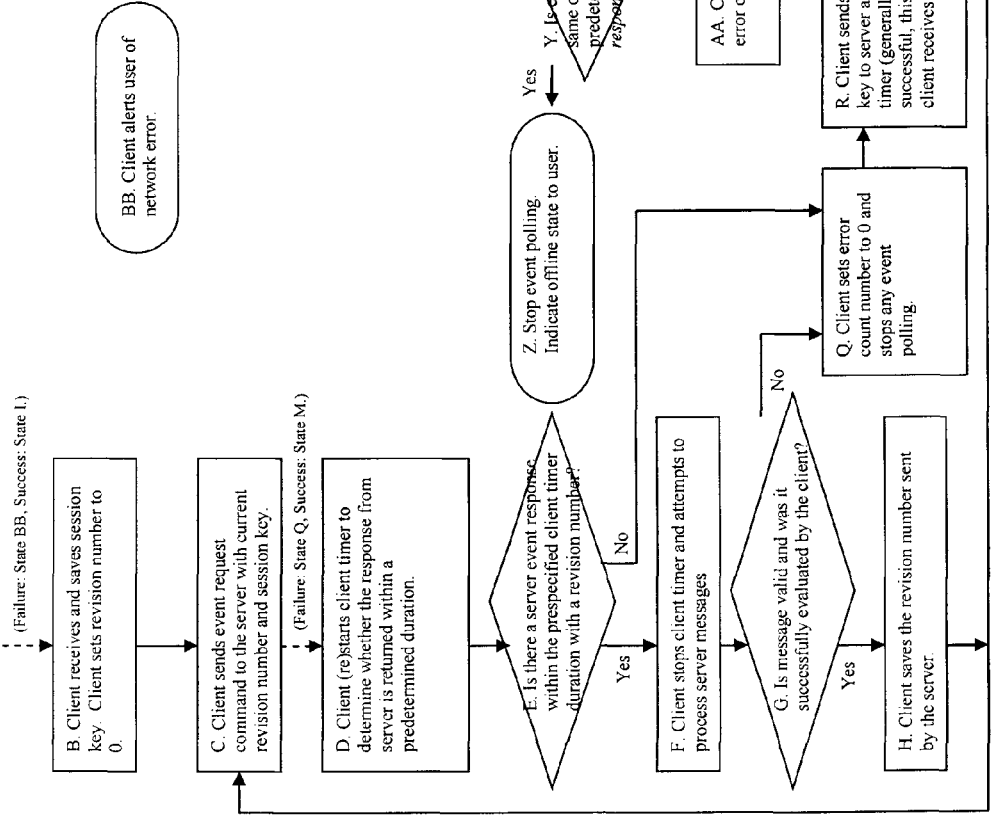
FIG. 4 illustrates a flow diagram of an exemplary client side polling process, according to another embodiment of the present invention.

FIG. 4 illustrates a flow diagram of an exemplary client side polling process 400, according to another embodiment of the present invention. According to one embodiment, client 110, 160 may perform process 400. In process 400, dotted lines indicate places where communication between the server (such as MMSW server 130) and client could fail. The letter numbers along the dotted line indicate what step(s) are triggered in the event of successful and unsuccessful communication. Two timers are used in process 400—a client timer and a network failure timer. The client timer is used to determine whether the server responds to an event request within a predetermined amount of time. If the server does not respond, the client assumes anan application error or network disruption has occurred that has prevented the server from returning an event's response. The network failure timer is used to determine the intervals at which the client attempts to communicate with the server in the event of a network disruption or application error. Two limits are used in process 400—a user interface no-response limit and a server no-response limit. The user interface no-response limit determines how many times the client attempts reconnecting with the server before notifying the user of a network disruption. The server no-response limit determines how many times the client attempts reconnecting with the server before terminating the application. The server no-response limit typically exceeds the user interface no-response limit.

(Client processing block A) The client sends a predetermined session initiation command to the server to initiate the session, generate a session key, and to trigger server processing block I. In the event that the client cannot establish communication with the server, the client moves to client processing block BB. This is typically the first request the client sends to the server and represents the entry point for the application.

(Client processing block B) The client receives and saves the unique session key returned from the server that was requested in client processing block A. For future messages (e.g. sending messages, requesting new events, setting user preferences, or activity notifications) that require authentication, this session key is used to verify the client's identity. The client sets the event revision number to 0.

The event revision number is used to identify each event network message communicated from the server to the client. It is used to request events in client processing block C. Initially it is 0 (client processing block B) and new event revision numbers are sent in the server response received in client processing block E. When the client requests new event messages in client processing block C, it sends the most recently received event revision number to the server in its event request. The server does not delete events until it receives validation, typically in the form of an event request from the client to the server with the most recent revision number, that the client has successfully handled the previous events. When a network disruption or application error occurs, the server queues events. The server continues to queue events until the client sends an event request with a revision number that is equal to or higher than the queued events (see server processing block N). If the client requests events with the same revision number twice, duplicate events will be sent to the client. This prevents missed event messages.

(Client processing block C) The client sends a predetermined event request message which includes the current revision number and the session key. This triggers server processing block M. In the event of a server error or network disruption, the client tries to reestablish communication with the server (client processing block Q). If the communication is successful and the client is able to send the request to the server, then process 400 advances to client processing block D. It is important to note that client event requests are asynchronous and the server may not return a response immediately to the client. The server may wait as long as the duration of the server timer to return an event's response to the client.

(Client processing block D) The client (re)starts the client timer for a predetermined amount of time (e.g. 45 seconds). The client timer is typically longer than the server timer but shorter in duration than the session timer. The client timer is used to detect when network disruptions or application errors occur. Since the client timer is longer than the server timer, the server should return an event before the client timer expires unless an application interruption occurs such as a network disruption or server error.

(Client decision block E) Does the server send an events response to the client before the client timer expires? It is important to note that the server event response may consist of only a revision number and may not contain event data if no event occurs within the server timer duration. If the server returns an events response to the client, the client moves to client processing block F. If the client timer expires before an events response is received from the server, the client assumes a network disruption or application has occurred and moves to client processing block Q and attempts to reestablish communication with the server.

(Client processing block F) Upon receiving a server event response to the client event request in client processing block C, the client clears the client timer. The client parses and/or evaluates the server event response.

(Client decision block G) If either the server event response cannot be evaluated by the client (e.g. evaluating the server event response causes an application error or the event message is not well-formed), the client moves to client processing block Q. If the server event response can be evaluated by the client, the client moves to processing block H.

(Client processing block H) After the client application successfully processes the server event response in client processing block G, the client saves the revision number contained in the server event response. This revision number is sent to the server in the future client event message request in client processing block C.

The client repeats the event polling process by moving to client processing block C. In most cases, the client continues to cycle through blocks C, D, E, F, G, and H for the duration of the application except in the event of a network disruption or application error. In the event of a network disruption or application error, the client moves to processing block Q to attempt to reestablish communication with the server. When and if client-to-server communication is reestablished (client processing block U), the client moves to processing block C.

Figure 5:
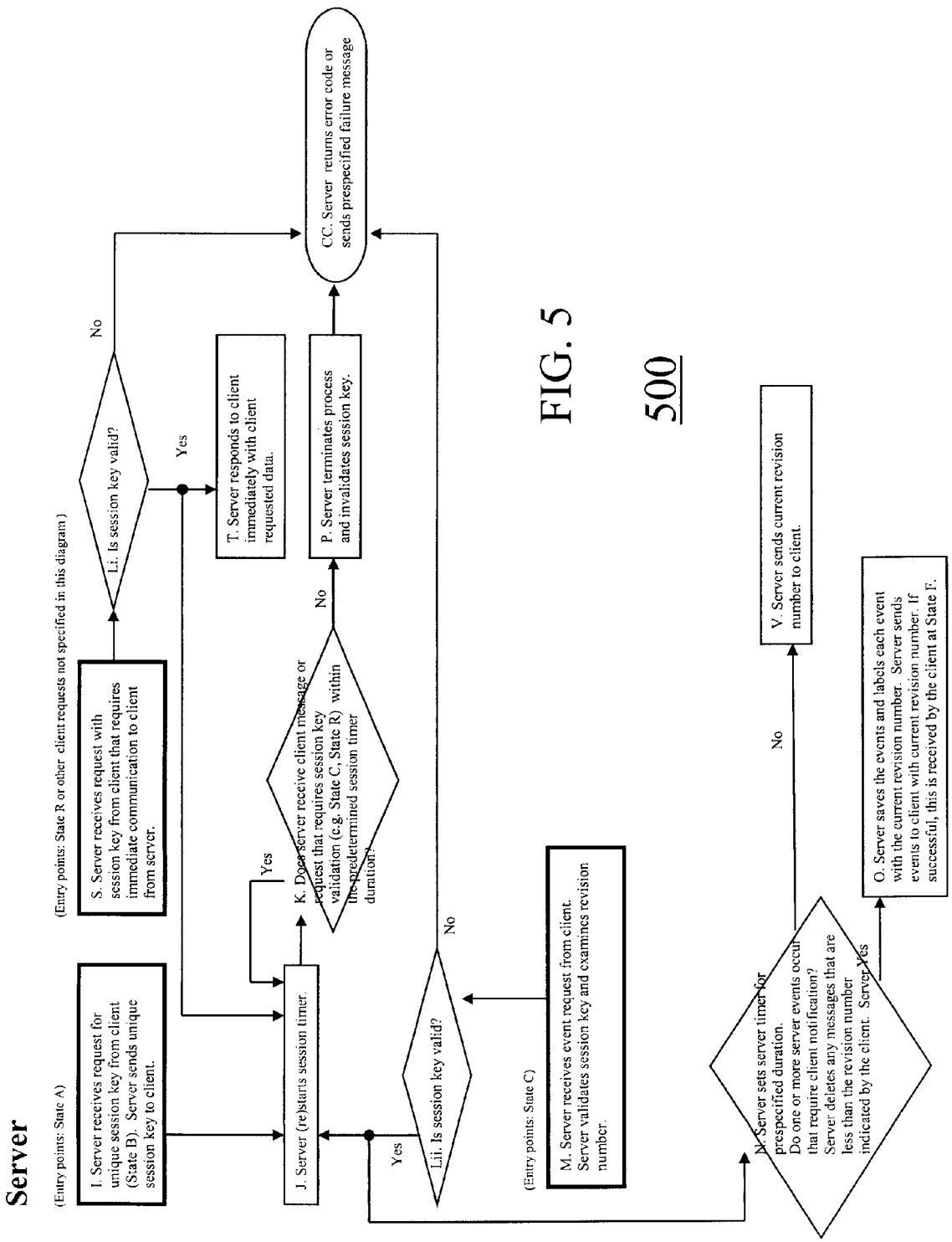
FIG. 5 illustrates a flow diagram of an exemplary server side polling process, according to another embodiment of the present invention.

FIG. 5 illustrates a flow diagram of an exemplary server polling process 500, according to one embodiment of the present invention. Two timers are used in process 500—a session timer and a server timer. The session timer defines how long the session key should remain valid without receiving any valid client requests before terminating the session. The server timer determines how long the server should wait to return an events response to the client if no new event messages occur. Server polling process 500 has three entry points within the flow diagram: 1) server processing block I where the client first requests a unique session key, 2) server processing block S where the client makes a request that requires the server validating the session key before returning a response to the client, and 3) server processing block M where the client requests new events with a valid session key and revision number.

Upon receiving a request from client processing block A, the server initiates an application session identifiable by a unique session key (server processing block I). That session key is returned to the client triggering client processing block B. If the server session key response is not received by the client, the client moves to processing block BB. Processing block I typically marks the server's starting point for the application.

(Server processing block J) The server (re)starts the session timer (typically but not limited to 100-300 seconds). The session timer is reset when the server receives a client request or a client message with a valid session key as determined by server processing block Li and server processing block Lii. The session timer is used to expire the application when the user is believed to be no longer present. For example, this might happen if the user closes the application, in the event of a network disruption, or if an application error occurs before the client can communicate a predetermined quit request to the server.

(Server decision block K) Does the server receive a client message or a client request with a valid session key? If yes, the server moves to processing block J where the session timer is restarted. The session timer is reset every time a client request or message is received with a valid session key that corresponds to the application including client processing block C and client processing block R. Any client message or request that requires server validation (e.g. an instant message send event, a typing notification event, or a user preference setting update) triggers server processing block K and reset the server's session timer. The server continues to cycle through processing block J and processing block K throughout the application session.

If the session timer expires because a client message or request is not received for the duration of the session timer, the server terminates the application and invalidates the corresponding session key (server processing block P). Server processing block CC provides that future client requests are ignored or receive a predetermined failure message. In an alternate embodiment, upon reaching server processing block P, the server reattempts communication with the client before terminating the application.

(Server decision block L) The server examines the session key and if it is valid, it resets the session timer in server processing block J. If the session key is invalid or has expired, the server moves to processing block CC.

(Server decision block Li) In the event that the session key is valid, the server moves to server processing block T.

(Server decision block Lii) In the event that the session key is valid, the server moves to server processing block N.

(Server processing block M) The server receives a client event request initiated by client processing block C. The server examines the session key (processing block Lii) and if the session key is valid, the server moves to server processing block K and server processing block J thus resetting the session timer. If the session key is invalid, the server moves to processing block CC.

(Server processing block N) The server examines the event revision number from the client and deletes any events with revision numbers that are less than or equal to the client event revision number. The revision number syncing ensures that messages and events are not dropped between the client or server during a network disruption or application error. If the client includes the current revision number, the server increments the revision number by one. The server (re)sets a server timer (typically 30 seconds). The server returns events to the client as soon as events are available (server processing block O). However, if there are no events, the server waits for the length of time predetermined by the server timer (e.g. 30 seconds) before returning an events response to the client (server processing block V). The events response from the server in server processing block V and server processing block O contains the new revision number. By waiting for events to appear before returning a response to the server, the amount of traffic between the client and server is reduced while still allowing instantaneous or nearly instantaneous communication between the server and client.

In some cases, the server may wait a small span of time (typically less than two seconds) before returning an events response to the client. This might occur if the server sees an event that is typically paired with one more future events that have not yet appeared. It may also occur if the server wants to limit client processing or network traffic by consolidating events. It might also occur if the server wants to analyze, modify, or consolidate events before sending the events to the client.

(Server processing block O) An event becomes available that should be communicated to the client. The server labels each event with the current revision number and saves the events to a queue in memory. The client sends the events to the client in a message packet that contains the revision number increment in server processing block N. If successful, the client receives the response and moves to client processing block F.

(Server processing block P) The session timer has expired. Server terminates process and invalidates the session key. Any future client requests with the old session key triggers server processing block CC and the server either ignores the messages or responds with a predetermined failure message (processing block CC)

(Client processing block Q) Returning to process 400 of FIG. 4, client process block Q marks the entry point for the client reestablishing communication with the server and typically occurs in the event of a network disruption or application error. The client stops the client timer associated with event polling and stops network communication with the server. The client sets the error count number to 0. It is important to note that the client may send additional server requests beyond what is outlined in this illustration such as user and application-triggered requests. In the event that any of these server requests fail, the client attempts to reestablish communication with the server (client processing block Q).

Alternative 1: Instead of halting all communication with the server, the client can queue requests and messages to the server when the client is in client processing block Q, processing block R, processing block W, processing block X, processing block Y, processing block AA, and processing block Z. When the client-to-server communication resumes (either in client processing block U or after the client is in processing block Z and the user has requested a new session key), the client can send all or a selected number of those messages, requests, or updates to the server.

Alternative 2: The client could stop only event polling. Any other client requests to the server (typically triggered by the user) could be sent to the server and if successful, could send the client immediately to processing block U. If not successful, the user can be notified of a network disruption or application error, the request can be repeated at later intervals, or the request (and future requests) could be saved and queued to retry when communication between the client and server is restored.

(Client processing block R) Client sends predetermined command with session key to backend and waits predetermined network failure time (typically 5-20 seconds) to see if a successful response is returned from the server. The network failure timer is generally shorter than the session key, server, and client timers. The server attempts to respond immediately to this predetermined session key validation command. If successful, then the client moves to processing block U. If unsuccessful (e.g. a network error occurs, the server returns a predetermined failure message, or the network timer expires before receiving a response from the server), the client moves to processing block W.

Alternative 1: In the event that the server sends an invalid event in client processing block G (e.g. message cannot be evaluated by the client, server message is poorly formed), event polling ceases and the client attempts to reestablish communication with the server (processing block Q). When the client is able to establish a connection with the server, the event polling is restarted and because the client has not updated the revision number, the server may send the invalid event again. To prevent an infinite loop from occurring, a limit can be placed on the number of times the client moves between processing block C and processing block R and receives the same or a similar invalid event within a predetermined amount of time. If this loop is detected, the client can either attempt to extract the revision number in the invalid event or increment the revision number based upon the previous valid event received from the server. When the client increments the revision number, the server will delete the invalid event, thus guaranteeing that the server will not send the same request to the client and the infinite loop is avoided.

Alternative 2: In the event that a server message cannot be evaluated, the client can alternatively discard the message, repair the message, and/or extract the valid portions of the server message, and then continue event polling without entering processing block Q.

Alternative 3: The server could alternatively detect the infinite loop and either attempt to repair the message or discard the message and continue sending events to the client.

(Server processing block S) Server receives request with session key from client that requires communication from server to client. This request could be triggered by client processing block R or from another client request not outlined in this diagram. The server validates the session key (server processing block Li) before responding. If the session key is valid, the server session timer is (re)set in processing block J.

(Server processing block T) The server has validated the session key in server processing block Li. The server responds to client with data depending upon the type of client request received in server processing block S.

(Client processing block U) Client receives predetermined success message in response to the session key validation request in client processing block R. The client exits the network recovery loop initiated in client processing block Q and (re)starts event polling in client processing block C.

(Server processing block V) The server timer has expired before any events need to be returned by the client (requested in client processing block C). The server sends an event response to the client with a session key and the event revision number that was incremented in server processing block N.

(Client decision block W) The server has not responded to the predetermined session key validation command in client processing block R. Is the error count number that is set in processing block Q (and incremented in processing block AA) greater than or equal to the user interface no-response limit and has the user interface not previously alerted the user to a network disruption or application error? If yes, the client moves to processing block X. If no, the client moves to processing block Y. The user interface no-response limit is typically less than the server no-response limit.

(Client processing block X) The client alerts the user of network disruption or application error. This could be in the form of (but is not limited to) a written message, sound, graphic, an action, or a new window or alert box. The client moves to processing block Y.

(Client decision block Y) Is the error count that is set in client processing block Q and incremented in processing block AA greater than or equal to the server no-response limit? If yes, move to processing block Z. If no, move to processing block AA.

(Client processing block Z) Client has attempted to reestablish communication with the server as many times as predetermined by the server no-response limit. Typically the total amount of time looping through client processing block R, processing block X, processing block W, processing block Y and processing block AA (determined by the server no-response limit and the network failure timer) is approximately equal to or slightly longer than the duration of the server session timer. The client terminates event polling and communication with the server. The client notifies the user of a network disruption or application error. Any future communication with the server requires a new session key and is typically initiated by the user requesting to reconnect with the server or restart the application.

Alternative 1: Similarly, the client terminates the event polling process, and then attempts to create a new session with the server at regularly scheduled intervals or using exponential backoff to schedule future communication with the server.

(Client processing block AA) The client has not received a response to the request in client processing block R. The client increments the error count number by one and moves to processing block R.

(Client processing block BB) In the event that the client cannot establish a session key with the server or the client does not receive a response to the initial event polling request to the server (either client-to-server communication or server-to-client communication fails in processing block A or processing block C or an application error occurs), the client notifies the user of a network disruption or application error. This notification could be in the form of (but is not limited to) a written message, sound, graphic, action, or a new window or alert box. Some other alternative client responses are outlined here:

Alternative 1: The client could reattempt to establish server communication at predetermined intervals or using exponential backoff at later intervals.

Alternative 2: The client could include alert the user that a network interruption or application error has been detected and then provide the user with the capability of specifying when and/or how often the client should (re)attempt communication with the server.

(Server processing block CC) The client has made a request after the session timer has expired, with an invalid session key, or with a request that is poorly-formed or not recognized by the server. The server returns a predetermined error code or ignores the client request.

As described above, the client makes certain requests to the server, including a request to initiate and create session key (processing block I that is typically requested by the client at processing block A);

a request to get next events (processing block M that is typically requested by the client at processing block C)

a request to verify the session key or to perform a request that requires a valid session key (processing block S that is typically requested by the client at processing block R, processing block C, and in other client requests.)

A method and system for event polling have been disclosed. Although the present methods and systems have been described with respect to specific examples and subsystems, it will be apparent to those of ordinary skill in the art that it is not limited to these specific examples or subsystems but extends to other embodiments as well.

We claim:

1. A method comprising:
receiving, by a server computer system, an event request from a client device, the event request including an event revision number;
if the event revision number received from the client device matches a current revision number stored by the server computer system:
incrementing, by the server computer system, the current revision number;
waiting, by the server computer system, for an event from an event server;
transmitting, by the server computer system to the client device, the event and the incremented current revision number when the event is received from the event server; and
storing, by the server computer system, the event with the incremented current revision number in an event queue; and
if the event revision number received from the client device does not match the current revision number stored by the computer system:
identifying, by the server computer system, one or more events in the event queue having a revision number greater than the event revision number received from the client device; and
transmitting, by the server computer system, the one or more events and the current revision number to the client device.

2. The method of claim 1 further comprising, if the event revision number received from the client device matches the current revision number stored by the server computer system:
resetting a server timer upon receiving the event revision number; and
if an event is not received from the event server before the server timer expires, transmitting only the incremented current revision number to the client device.

3. The method of claim 2 wherein, if the event is received before the server time expires, the event is transmitted to the client device immediately upon receipt.

4. The method of claim 3 further comprising providing instructions to the client device to set a client timer that expires if the event is not received from the server computer system in a predetermined time period.

5. The method of claim 4 further comprising providing instructions to the client device to reestablish communications with the server computer system if the client timer expires, and if a network failure timer has not expired a predetermined number of server no-response limit times.

6. The method of claim 1 wherein a client timer is set equal to or greater than a server timer.

7. The method of claim 1 further comprising, if the event revision number received from the client device matches the current revision number stored by the computer system, deleting any events in the event queue having a revision number that is less than or equal to the event revision number received from the client device.

8. A non-transitory computer-readable medium having stored thereon program code executable by a computer system, the program code including:
   code that causes the computer system to receive an event request from a client device, the event request including an event revision number;
   if the event revision number received from the client device matches a current revision number stored by the computer system:
      code that causes the computer system to increment the current revision number;
      code that causes the computer system to wait for an event from an event server;
      code that causes the computer system to transmit to the client device the event and the incremented current revision number when the event is received; and
      code that causes the computer system to store the event with the incremented current revision number in an event queue; and
   if the event revision number received from the client device does not match the current revision number stored by the computer system:
      code that causes the computer system to identify one or more events in the event queue having a revision number greater than the event revision number received from the client device; and
      code that causes the computer system to transmit the one or more events and the current revision number to the client device.

9. The non-transitory computer-readable medium of claim 8 wherein the program code further comprises, if the event revision number received from the client device matches a current revision number stored by the computer system:
   code that causes the computer system to reset a server timer upon receiving the event revision number; and
   if an event is not received from the event server before the server timer expires, code that causes the computer system to transmit only the incremented current revision number to the client device.

10. The non-transitory computer-readable medium of claim 9 wherein, if the event is received before the server timer expires, the event is transmitted to the client device immediately upon receipt.

11. The non-transitory computer-readable medium of claim 10 wherein the program code further comprises code that causes the computer system to provide instructions to the client device to set a client timer that expires if the event is not received from the computer system in a predetermined time period that is equal to or greater than a length of the server timer.

12. The non-transitory computer-readable medium of claim 11 wherein the program code further comprises code that causes the computer system to provide instructions to the client device to reestablish communications with the computer system if the client timer expires, and if a network failure timer has not expired a predetermined number of server no-response limit times.

13. The non-transitory computer-readable medium of claim 8 wherein the program code further comprises code that causes the computer system to set a client timer equal to or greater than a server timer.

14. The non-transitory computer-readable medium of claim 8 wherein the program code further comprises, if the event revision number received from the client device matches the current revision number stored by the computer system, code that causes the computer system to delete any events in the event queue having a revision number that is less than or equal to the event revision number received from the client device.

15. A computer system comprising:
   a processor configured to:
      receive an event request from a client device, the event request including an event revision number;
      if the event revision number received from the client device matches a current revision number stored by the server computer system:
         increment the current revision number;
         wait for an event from an event server;
         transmit, to the client device, the event and the incremented current revision number when the event is received from the event server; and
         store the event with the incremented current revision number in an event queue; and
      if the event revision number received from the client device does not match the current revision number stored by the computer system:
         identify one or more events in the event queue having a revision number greater than the event revision number received from the client device; and
         transmit the one or more events and the current revision number to the client device.

16. The computer system of claim 15 wherein the processor is further configured to, if the event revision number received from the client device matches the current revision number stored by the computer system:
   reset a server timer upon receiving the event revision number; and
   if an event is not received from the event server before the server timer expires, transmit only the incremented current revision number to the client device.

17. The computer system of claim 15 wherein the processor is further configured to, if the event revision number received from the client device matches the current revision number stored by the computer system:
   delete any events in the event queue having a revision number that is less than or equal to the event revision number received from the client device.

* * * * *

UNITED STATES PATENT AND TRADEMARK OFFICE
CERTIFICATE OF CORRECTION

| | | |
|---|---|---|
| PATENT NO. | : 7,961,701 B2 | Page 1 of 1 |
| APPLICATION NO. | : 11/691439 | |
| DATED | : June 14, 2011 | |
| INVENTOR(S) | : Elaine Wherry et al. | |

It is certified that error appears in the above-identified patent and that said Letters Patent is hereby corrected as shown below:

Title Page, under (73) Assignee, please delete "Meebo Inc." and insert --Meebo, Inc.--

Signed and Sealed this
Third Day of July, 2012

David J. Kappos
*Director of the United States Patent and Trademark Office*